(12) United States Patent
Schine et al.

(10) Patent No.: US 7,433,319 B2
(45) Date of Patent: Oct. 7, 2008

(54) SYSTEM AND METHOD FOR COLLECTING AND PRESENTING SERVICE LEVEL AGREEMENT METRICS IN A SWITCHED METRO ETHERNET NETWORK

(75) Inventors: Bruce Alden Schine, San Leandro, CA (US); Paul A. Tomalenas, Alamo, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 745 days.

(21) Appl. No.: 10/975,022

(22) Filed: Oct. 27, 2004

(65) Prior Publication Data

US 2006/0087979 A1   Apr. 27, 2006

(51) Int. Cl.
*H04L 12/26* (2006.01)
(52) U.S. Cl. .................... 370/248; 370/252
(58) Field of Classification Search ................. 370/241, 370/248, 249, 252
See application file for complete search history.

(56) References Cited

U.S. PATENT DOCUMENTS

| | | | |
|---|---|---|---|
| 5,926,649 A | | 7/1999 | Ma et al. |
| 6,075,773 A | * | 6/2000 | Clark et al. .................. 370/241 |
| 6,279,039 B1 | | 8/2001 | Bhat et al. |
| 6,363,056 B1 | * | 3/2002 | Beigi et al. .................. 370/252 |
| 6,452,915 B1 | | 9/2002 | Jorgensen |
| 6,590,885 B1 | | 7/2003 | Jorgensen |
| 6,594,246 B1 | | 7/2003 | Jorgensen |
| 6,628,629 B1 | | 9/2003 | Jorgensen |
| 6,640,248 B1 | | 10/2003 | Jorgensen |
| 6,680,922 B1 | | 1/2004 | Jorgensen |
| 7,185,232 B1 | * | 2/2007 | Leavy et al. .................. 714/41 |
| 2002/0080750 A1 | | 6/2002 | Belcea |
| 2002/0085526 A1 | | 7/2002 | Belcea |
| 2002/0089945 A1 | | 7/2002 | Belcea |
| 2002/0099854 A1 | | 7/2002 | Jorgensen |
| 2002/0150075 A1 | | 10/2002 | Belcea |
| 2003/0067903 A1 | | 4/2003 | Jorgensen |
| 2003/0142638 A1 | | 7/2003 | Belcea |
| 2003/0142645 A1 | | 7/2003 | Belcea |
| 2003/0185166 A1 | | 10/2003 | Belcea |
| 2003/0200548 A1 | | 10/2003 | Baran et al. |
| 2003/0223466 A1 | | 12/2003 | Noronha et al. |
| 2003/0225549 A1 | * | 12/2003 | Shay et al. .................. 702/182 |
| 2004/0017780 A1 | * | 1/2004 | Tazebay et al. .............. 370/248 |
| 2004/0073718 A1 | * | 4/2004 | Johannessen et al. ....... 709/400 |
| 2005/0281392 A1 | * | 12/2005 | Weeks et al. .................. 379/22 |

* cited by examiner

*Primary Examiner*—Min Jung
(74) *Attorney, Agent, or Firm*—Toler Law Group (57) ABSTRACT

A method for monitoring a network includes injecting a plurality of data packets into the network. The data packets are transmitted between a source device and a destination device. A plurality of reflected data packets is collected. The plurality of reflected data packets are reflected from the destination device to the source device. Also, the plurality of reflected data packets includes at least a portion of the data packets injected into the network. The method further includes determining a total number of the reflected data packets. A packet delivery rate, a latency value, and a jitter value can be calculated based at least partially on the total number of reflected data packets. Further, the packet delivery rate, the latency value, and the jitter value can be reported to a user.

32 Claims, 4 Drawing Sheets

SYSTEM AND METHOD FOR COLLECTING AND PRESENTING SERVICE LEVEL AGREEMENT METRICS IN A SWITCHED METRO ETHERNET NETWORK

FIELD OF THE DISCLOSURE

The present disclosure relates generally to the monitoring of switched metro Ethernet networks.

BACKGROUND

Ethernet is a local-area network architecture that was developed in the late 1970s for use in offices, e.g., to interconnect computers to each other and to a common printer. In recent years, companies have begun to develop ways to expand Ethernet principles to wide area networks, e.g., using Internet routers that are interconnected in various ways. The result has been the creation of switched metro Ethernet data networks.

In an effort to market switched metro Ethernet services, service providers can offer varying levels of service for different prices. Moreover, a service can be considered a high level service and may be offered at a premium price if it has certain characteristics that are beneficial to customers. For example, a service provider may offer a service in which data is delivered at a relatively high packet delivery rate. Further, a service level agreement between a service provider and a customer may state that the data will be delivered at or above a particular packet delivery rate and the customer will pay a particular fee for that promised packet delivery rate. However, it can be difficult to provide an indication to a customer that the service they are receiving is meeting the level agreed to in the service level agreement.

Accordingly, there is a need for a system and method for collecting and presenting service level agreement metrics in a switched metro Ethernet network.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method for monitoring a network includes injecting a plurality of data packets into the network. The data packets are transmitted between a source device and a destination device. A plurality of reflected data packets is collected. In a particular embodiment, the plurality of reflected data packets are reflected from the destination device to the source device. Also, the plurality of reflected data packets includes at least a portion of the data packets that are injected into the network.

In a particular embodiment, the method further includes determining a total number of the reflected data packets. A packet delivery rate, a latency value, and a jitter value can be calculated based at least partially on the total number of reflected data packets. Further, the packet delivery rate, the latency value, and the jitter value can be reported to a user. Also, in a particular embodiment, the network is a switched metro Ethernet network and the plurality of data packets are created at a server and injected into an edge switch of the switched metro Ethernet network. Particularly, the plurality of data packets is created by a service assurance agent (SAA) within the server. Further, in a particular embodiment, the source device is a first edge switch of a switched metro Ethernet network, the destination device is a second edge switch of the switched metro Ethernet network, and the first edge switch is coupled to the second edge switch via a core system of the switched metro Ethernet network.

In another embodiment, a server includes a processor and a memory device that is coupled to the processor. A service assurance agent (SAA) is embedded within the memory device and the SAA is executable by the processor. In a particular embodiment, the SAA includes instructions to inject a plurality of data packets into a switched metro Ethernet network from a source device to a destination device. Moreover, the SAA includes instructions to collect a plurality of data packets that are reflected from the destination device back to the source device.

In yet another embodiment, a switched metro Ethernet network includes a core system. A first edge switch and a second edge switch are coupled to the core system. Further, a computer program is embedded within the server. In a particular embodiment, the computer program includes instructions to calculate a data packet delivery rate between the first edge switch and the second edge switch.

Figure 1:
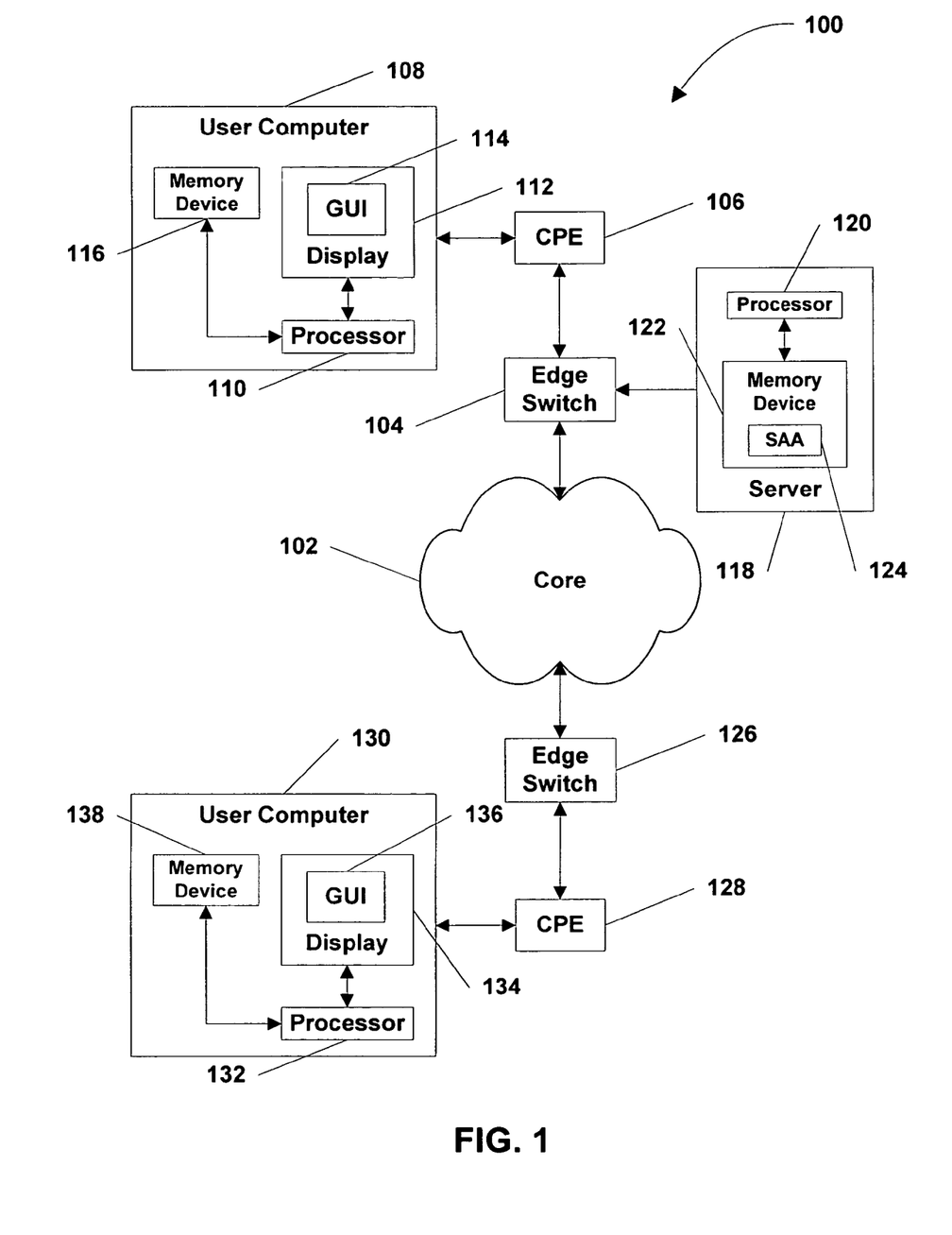
FIG. 1 is a diagram of a switched metro Ethernet system.

Referring to FIG. 1, a switched metro Ethernet network is shown and is generally designated 100. As shown, the switched metro Ethernet network 100 includes a core system 102. Particularly, the core system 102 includes a plurality of switches and routers than can be used to route network traffic through the core system 102. In a particular embodiment, the switches and routers are optical equipment. As illustrated in FIG. 1, a first edge switch 104 is coupled to the core system 102. Also, a first customer premises equipment (CPE) 106 is coupled to the edge switch 104. FIG. 1 further shows a first user computer 108 coupled to the first CPE 106. In a particular embodiment, the CPE 106 can be a modem, a gateway, or a router. Further, the first user computer 108 can be a desktop computer, a laptop computer, a handheld computer, or any other computer device.

In a particular embodiment, the first user computer 108 includes a processor 110 and a display 112 that are coupled to the processor 110. Moreover, as illustrated in FIG. 1, a graphical user interface (GUI) 114 can be presented to a user at the first user computer 108 via the display 112. In a particular embodiment, information regarding the switched metro Ethernet network 100 including one or more metrics concerning the operation of the switched metro Ethernet network 100 can be presented to a user via the GUI 114. FIG. 1 further shows a memory device 116 that is coupled to the processor 110 within the first user computer 108.

As shown in FIG. 1, a server 118 can be coupled to the first edge switch 104. In a particular embodiment, the server 118 includes a processor 120 and a memory device 122. Further, in a particular embodiment, a service assurance agent (SAA) 124 is stored within the server 118, e.g., within the memory device 122. In a particular embodiment, the SAA 124 is a computer program that can have one or more instructions that can be executed by the processor 120 in order to collect and calculate one or more metrics concerning the operation of the switched metro Ethernet network 100. Further, the SAA 124 can present the metrics or any data derived from the metrics to the user computer 108 via the GUI 114.

FIG. 1 further shows that a second edge switch 126 is coupled to the core system 102. Moreover, a second CPE 128 is connected to the second edge switch 126. As illustrated in FIG. 1, a second user computer 130 is also coupled to the second CPE 128. In a particular embodiment, the second user computer 130 includes a processor 132 and a display 134 coupled thereto. Moreover, as illustrated in FIG. 1, a GUI 136 can be presented to a user at the second user computer 130. Particularly, information regarding the switched metro Ethernet network 100 including one or more metrics concerning the operation of the switched metro Ethernet network 100 can be presented to a user via the GUI 136. FIG. 1 also shows a memory device 138 that is coupled to the processor 132.

With this configuration of structure, the first user computer 108 can be networked to the second user computer 130 by the first CPE 106, the first edge switch 104, the core system 102, the second edge switch 126 and the second CPE 128. In a particular example, multiple offices of a single company at different locations can be networked via the switched metro Ethernet network 100.

Figure 2:
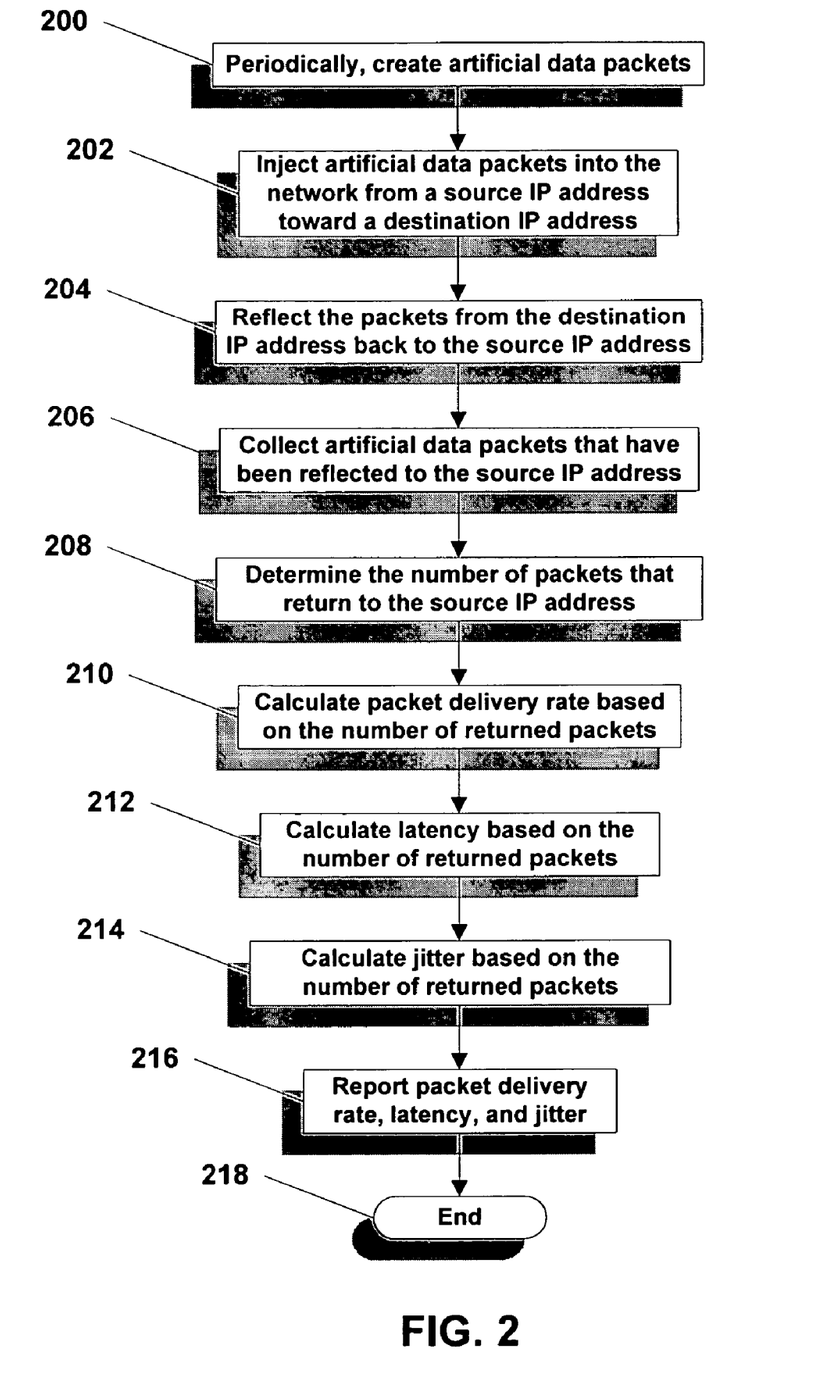
FIG. 2 is a flow chart to illustrate a method for collecting one or more metrics related to a switched metro Ethernet system and presenting those metrics to a user.

Referring to FIG. 2, a method for collecting one or more metrics related to a switched metro Ethernet system and for presenting those metrics to a user is disclosed. Commencing at block 200, the method includes periodically creating a predetermined number of artificial data packets. At block 202, the artificial data packets are injected into the network from a source Internet protocol (IP) address toward a destination IP address, e.g., from the first edge switch 104 (FIG. 1) to the second edge switch 126 (FIG. 1). In an illustrative embodiment, the artificial data packets can be created and injected into the network every fifteen minutes or less. Moving to block 204, the packets are reflected, or otherwise returned, from the destination IP address back to the source IP address, e.g., from the second edge switch 126 (FIG. 1) back to the first edge switch 104 (FIG. 1). Next, at block 206, the artificial data packets that have been reflected back to the source IP address are collected, e.g., by the SAA 124 (FIG. 1) within the server 118 (FIG. 1) coupled to the first edge switch 104 (FIG. 1).

Moving to block 208, a total number of packets that are reflected, or otherwise returned, to the source IP address is determined. At block 210, a packet delivery rate is calculated based on the total number of returned packets. In a particular embodiment, the packet delivery rate is a measure of the percentage of packets that reach the destination IP address and that are reflected back to the source IP address. Packet delivery rate can be determined using the following formula:

$$PDR = (\text{packets delivered to destination})/(\text{packets offered at source})$$

In a particular embodiment, in order to determine a more reliable value for packet delivery rate, several metrics can be used by the SAA 124 (FIG. 1). Table 1 shows several exemplary, non-limiting metrics that can be used by the SAA 124 (FIG. 1) in order to determine the packet delivery rate.

TABLE 1

Exemplary, non-limiting metrics used by the SAA in order to determine a Packet Delivery Rate.

| Variable | Measurement | Description |
|---|---|---|
| A | rttMonLatestJitterStatsNumOfRTT | The number of round trip times (RTTs) that are successfully measured |
| B | rttMonLatestJitterStatsPacketLossSD | The number of packets lost when sent from source to destination. |
| C | rttMonLatestJitterStatsPacketLossDS | The number of packets lost when sent from destination to source |
| D | RttMonLatestJitterStatsPacketOutOfSequence | The number of packets arrived out of sequence |
| E | rttMonLatestJitterStatsPacketMIA | The number of packets that are lost for which we cannot determine the direction. |
| F | RttMonLatestJitterStatsPacketLateArrival | The number of packets that arrived after the timeout |

Moreover, in a particular embodiment, the metrics shown in Table 1 can be used to determine a packet delivery rate using the following formula:

$$PDR = (\Sigma A * 100)/(\Sigma A + \Sigma B + \Sigma C + \Sigma D + \Sigma E + \Sigma F)$$

Returning to the description of FIG. 2, at block 212, a latency value is calculated based on the total number of returned packets. In an illustrative embodiment, latency is the delay that the packets experience as they flow through the network, e.g., from the first edge switch 104 to the second edge switch 126 and back. Particularly, latency can include the time that packets spend in buffers and the propagation delay. In a particular embodiment, several metrics can be used by the SAA 124 (FIG. 1) in order to determine latency. Table 2 shows several exemplary, non-limiting metrics that can be used by the SAA 124 (FIG. 1) in order to determine the latency value.

TABLE 2

Exemplary, non-limiting metrics used by the SAA in order to determine a latency value.

| Measurement | Description |
|---|---|
| rttMonLatestJitterStatsNumOfRTT | The number of RTTs that are successfully measured |
| rttMonLatestJitterStatsRTTSum | The sum of RTTs that are successfully measured |

TABLE 2-continued

Exemplary, non-limiting metrics used by the SAA in order to determine a latency value.

| Measurement | Description |
| --- | --- |
| rttMonLatestJitterStatsRTTMin | The minimum of RTTs that were successfully measured |
| rttMonLatestJitterStatsRTTMax | The maximum of RTTs that were successfully measured |
| rttMonLatestJitterStatsRTTSum2Low | The sum of squares of RTTs that are successfully measured |
| rttMonLatestJitterStatsRTTSum2High | (low/high order 32 bits) |
| rttMonJitterStatsOWSumSD | The sum of one way times from source to destination |
| rttMonJitterStatsOWMinSD | The minimum of all one way times from source to destination. |
| rttMonJitterStatsOWMaxSD | The maximum of all one way times from source to destination. |
| rttMonJitterStatsOWSumDS | The sum of one way times from destination to source. |
| rttMonJitterStatsOWMinDS | The minimum of all one way times from destination to source. |
| rttMonJitterStatsOWMaxDS | The maximum of all one way times from destination to source. |
| rttMonJitterStatsNumOfOW | The number of one way times that are successfully measured. |

In a particular embodiment, in order to calculate latency in one direction, e.g., from the first edge switch 104 (FIG. 1) to the second edge switch 126 (FIG. 1), the RTT numbers can be divided by two. Further, rttMonLatestJitterStatsRTTSum2Low and rttMonLatestJitterStatsRTTSum2High are optional metrics and can be collected if a calculation of a standard deviation is desired.

Continuing the description of FIG. 2, at block 214, a jitter value is calculated based on the total number of returned packets. In a particular embodiment, jitter is defined as the variance in the inter-packet arrival rate at the destination. In a particular embodiment, several metrics can be used by the SAA 124 (FIG. 1) in order to determine latency. Table 3 shows several exemplary, non-limiting metrics that can be used by the SAA 124 (FIG. 1) in order to determine the Jitter value.

TABLE 3

Exemplary, non-limiting metrics used by the SAA in order to determine a jitter value.

| Measurement | Description |
| --- | --- |
| rttMonJitterStatsMinOfPositivesSD | The minimum of absolute values of all positive jitter values from packets sent from source to destination. |
| rttMonJitterStatsMaxOfPositivesSD | The maximum of absolute values of all positive jitter values from packets sent from source to destination. |
| rttMonJitterStatsNumOfPositivesSD | The sum of number of all positive jitter values from packets sent from source to destination. |
| rttMonJitterStatsSumOfPositivesSD | The sum of all positive jitter values from packets sent from source to destination. |
| rttMonJitterStatsSum2PositivesSDLow | The sum of square of RTT's of all positive jitter values from packets sent from source to destination (low order 32 bits). |
| rttMonJitterStatsSum2PositivesSDHigh | The sum of square of RTT's of all positive jitter values from packets sent from source to destination (high order 32 bits). |
| rttMonJitterStatsMinOfNegativesSD | The minimum of all negative jitter values from packets sent from source to destination. |
| rttMonJitterStatsMaxOfNegativesSD | The maximum of all negative jitter values from packets sent from source to destination. |
| rttMonJitterStatsNumOfNegativesSD | The sum of number of all negative jitter values from packets sent from source to destination. |
| rttMonJitterStatsSumOfNegativesSD | The sum of RTT's of all negative jitter values from packets sent from source to destination. |
| rttMonJitterStatsSum2NegativesSDLow | The sum of square of RTT's of all negative jitter values from packets sent from source to destination (low order 32 bits). |
| rttMonJitterStatsSum2NegativesSDHigh | The sum of square of RTT's of all negative jitter values from packets sent from source to destination (high order 32 bits). |
| rttMonJitterStatsMinOfPositivesDS | The minimum of absolute values of all positive jitter values from packets sent from destination to source. |
| rttMonJitterStatsMaxOfPositivesDS | The maximum of absolute values of all positive jitter values from packets sent from destination to source. |
| rttMonJitterStatsNumOfPositivesDS | The sum of number of all positive jitter values from packets sent from destination to source. |
| rttMonJitterStatsSumOfPositivesDS | The sum of all positive jitter values from packets sent from destination to source. |
| rttMonJitterStatsSum2PositivesDSLow | The sum of square of RTT's of all positive jitter values from packets sent from destination to source (low order 32 bits). |
| rttMonJitterStatsSum2PositivesDSHigh | The sum of square of RTT's of all positive jitter values from packets sent from destination to source (high order 32 bits). |
| rttMonJitterStatsMinOfNegativesDS | The minimum of all negative jitter values from packets sent destination to source. |

TABLE 3-continued

Exemplary, non-limiting metrics used by the SAA in order to determine a jitter value.

| Measurement | Description |
| --- | --- |
| rttMonJitterStatsMaxOfNegativesDS | The maximum of all negative jitter values from packets sent from destination to source. |
| rttMonJitterStatsNumOfNegativesDS | The sum of number of all negative jitter values from packets sent from destination to source. |
| rttMonJitterStatsSumOfNegativesDS | The sum of RTT's of all negative jitter values from packets sent from destination to source. |
| rttMonJitterStatsSum2NegativesDSLow | The sum of square of RTT's of all negative jitter values from packets sent from destination to source (low order 32 bits). |
| rttMonJitterStatsSum2NegativesDSHigh | The sum of square of RTT's of all negative jitter values from packets sent from destination to source (high order 32 bits). |

In a particular embodiment, to calculate an average jitter value from a source to destination the following equation can be used:

(rttMonJitterStatsSumOfPositivesSD+rttMonJitterStatsSumOfNegativesSD)/(rttMonJitterStatsNumOfPositivesSD+rttMonJitterStatsNumOfNegatives SD)

Further, to calculate an average jitter value from a destination to a source, the following equation can be used:

(rttMonJitterStatsSumOfPositivesDS+rttMonJitterStatsSumOfNegativesDS)/(rttMonJitterStatsNumOfPositivesDS+rttMonJitterStatsNumOfNegativesDS)

Additionally, a maximum jitter value from a source to a destination is defined as the maximum between these values: rttMonJitterStatsNumOfNegativesSD and rttMonJitterStatsNumOfPositivesSD.

In an illustrative embodiment, the metrics described herein are simple network management protocol management information base (SNMP MIB) objects that can be collected using an SNMP collection mechanism.

Returning to FIG. 2, at block 216, the packet delivery rate, the latency value, and the jitter value are reported to a user. In a particular embodiment, the packet delivery rate, the latency value, and the jitter value are reported to the user via a GUI 114, 136 (FIG. 1) presented at one of the user computers 108, 130 (FIG. 1) and the method ends at state 218.

In a particular embodiment, the metrics described above and collected by the SAA 124 (FIG. 1) can be used to enhance or optimize the switched metro Ethernet network (FIG. 1). For example, if a user notices that a packet delivery rate between two locations is not at or above a stated value in a service level agreement, the user can contact the service provider who can verify the packet delivery rate and then, determine the cause of the problem and correct the problem, if possible.

Figure 3:
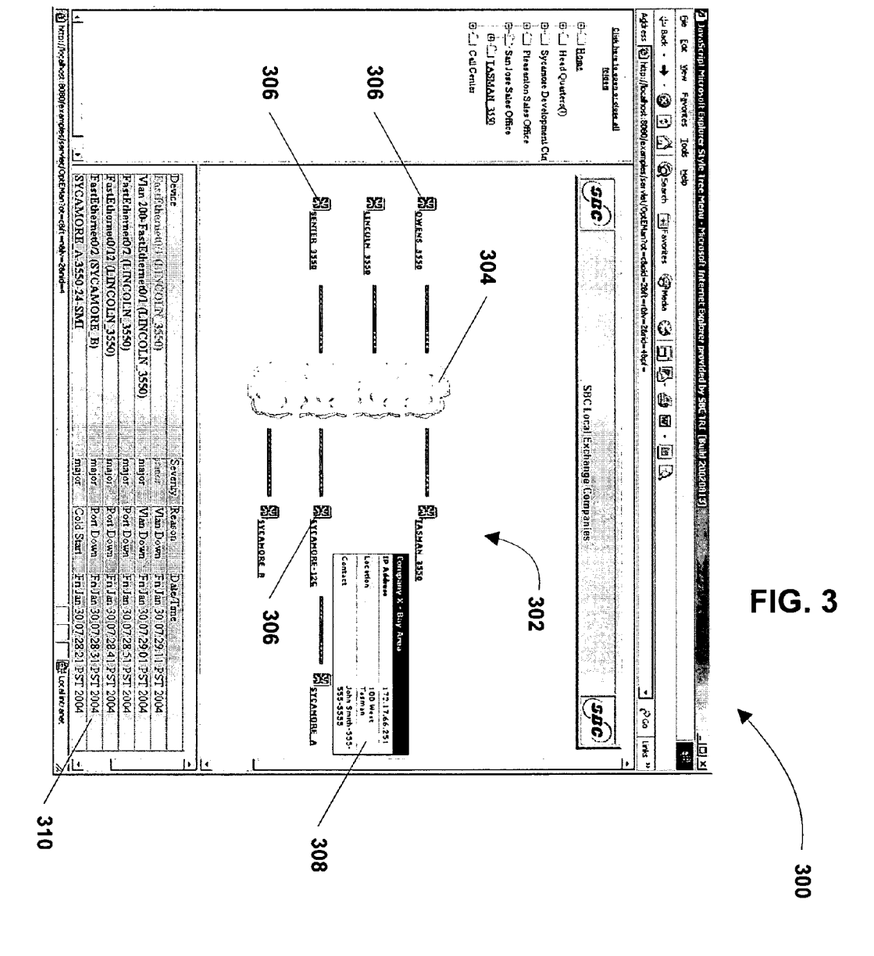
FIG. 3 is a general diagram representative of an embodiment of a graphical user interface that can be used to present one or more metrics related to a switched metro Ethernet system.

Referring now to FIG. 3, an exemplary, non-limiting embodiment of a graphical user interface (GUI) is shown and is generally designated 300. As shown, the GUI 300 includes a graphical representation of a user's network 302 showing a core network 304 and different CPE 306 and their locations. Further, the GUI 300 includes an information window 308 that provides information relevant to the CPE 306 when each is selected by a user. FIG. 3 also shows that the GUI 300 includes an information table 310 that provides network trouble information, e.g., device type, problem severity, reason, and date/time.

Figure 4:
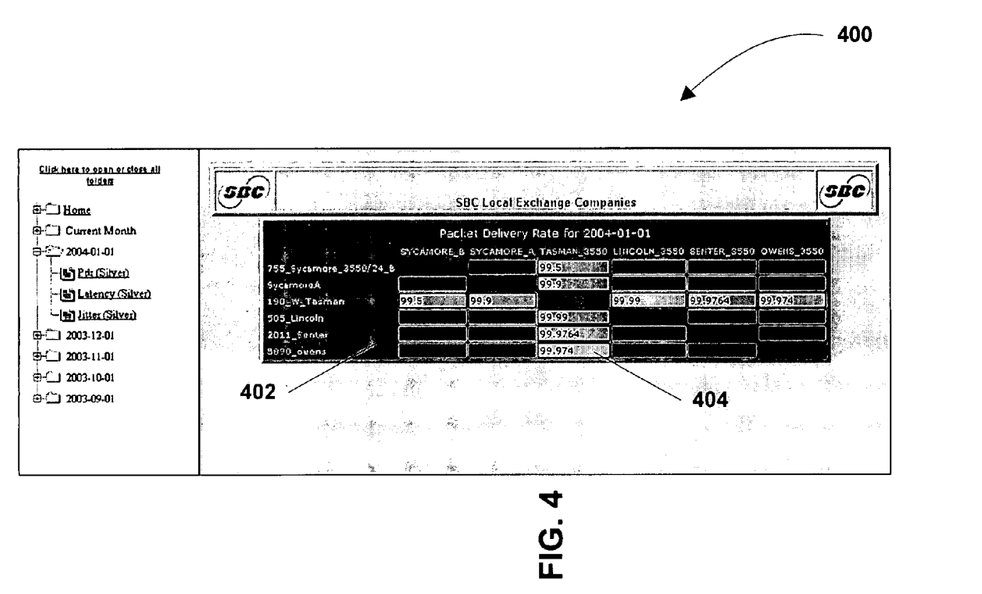
FIG. 4 is a general diagram representative of another embodiment of a graphical user interface that can be used to present one or more metrics related to a switched metro Ethernet system.

FIG. 4 shows another exemplary, non-limiting embodiment of a GUI, designated 400. The GUI 400 shown in FIG. 4 includes a matrix 402 of information blocks 404. A user can use the GUI 400 to determine a jitter value, a latency value, and a packet delivery rate between two CPEs within a switched metro Ethernet network. Further, the GUI 400 can indicate a level of service provided for in a service level agreement. In a particular embodiment, the GUI 400 can indicate the level of service by providing a certain color within the information blocks 404, e.g., bronze, silver, or gold.

With the configuration of structure described above, the system and method for collecting and presenting service level agreement metrics disclosed herein provides the capability for determining jitter, latency, and packet delivery rate between two edge switches within a switched metro Ethernet. Each edge switch is coupled to a CPE and each edge switch represents the outer boundary of the portion of a switched metro Ethernet that is under the control of a service provider. As such, the system and method can provide a close approximation of the jitter, latency, and packet delivery rate between the two CPEs coupled to the edge switches. Further, a GUI is provided for presenting the jitter, latency, and packet delivery rate information to a user via a computer. Using the information presented via the GUI, a user can verify that the terms of a service level agreement are being met.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for monitoring a network, the method comprising:
   injecting a plurality of data packets into the network, wherein the data packets are transmitted between a source device and a destination device;
   collecting a plurality of reflected data packets, wherein the plurality of reflected data packets are reflected from the destination device to the source device, and wherein the plurality of reflected data packets include at least a portion of the data packets injected into the network; and
   reporting to a user device, operably coupled to a customer equipment side of the source device, results from the collecting of the plurality of reflected data packets.

2. The method of claim 1, further comprising:
   determining a total number of the reflected data packets.

3. The method of claim 2, further comprising:
calculating a packet delivery rate based at least partially on the total number of reflected data packets.

4. The method of claim 3, further comprising:
calculating a latency value based at least partially on the total number of reflected data packets.

5. The method of claim 4, further comprising:
calculating a jitter value based at least partially on the total number of reflected data packets.

6. The method of claim 5, further comprising:
reporting at least one of the following to the user device: the packet delivery rate, the latency value, and the jitter value.

7. The method of claim 1, wherein the network is a switched metro Ethernet network.

8. The method of claim 7, wherein the plurality of data packets are created at a server and injected into an edge switch of the switched metro Ethernet network.

9. The method of claim 8, wherein the plurality of data packets are created by a service assurance agent (SAA) within the server.

10. The method of claim 1, wherein the source device is a first edge switch of a switched metro Ethernet network, the destination device is a second edge switch of the switched metro Ethernet network, and the first edge switch is coupled to the second edge switch via a core system of the switched metro Ethernet network.

11. A server, comprising:
a processor;
a memory device coupled to the processor;
a service assurance agent (SAA) embedded within the memory device and executable by the processor, the SAA comprising:
instructions to inject a plurality of data packets into a switched metro Ethernet network from a source device to a destination device;
instructions to collect a plurality of data packets that are reflected from the destination device back to the source device; and
instructions to report to a user device, operably coupled to a customer equipment side of the source device, results from collecting the plurality of reflected data packets.

12. The server of claim 11, wherein the SAA further comprises:
instructions to determine a total number of the reflected data packets.

13. The server of claim 12, wherein the SAA further comprises:
instructions to calculate a packet delivery rate based at least partially on the total number of reflected data packets.

14. The server of claim 13, wherein the SAA further comprises:
instructions to calculate a latency value based at least partially on the total number of reflected data packets.

15. The server of claim 14, wherein the SAA further comprises:
instructions to calculate a jitter value based at least partially on the total number of reflected data packets.

16. The server of claim 15, wherein the SAA further comprises:
instructions to report at least one of the following to the user device: the packet delivery rate, the latency value, and the jitter value.

17. The server of claim 11, wherein the source device is a first edge switch, the destination device is a second edge switch, and the first edge switch is coupled to the second edge switch via a core system.

18. The server of claim 17, wherein the plurality of artificial data packets are injected into the first edge switch.

19. A switched metro Ethernet network, comprising:
a core system;
a first edge switch coupled to the core system;
a second edge switch coupled to the core system;
a server coupled to the switched metro Ethernet network;
a computer program embedded within the server, the computer program comprising:
instructions to calculate a data packet delivery rate between the first edge switch and the second edge switch; and
instructions to report to a user computer coupled on a customer side of customer premises equipment that is coupled to the first edge switch results from calculating the data packet delivery rate.

20. The switched metro Ethernet network of claim 19, wherein the computer program farther comprises:
instructions to calculate a data packet latency value between the first edge switch and the second edge switch.

21. The switched metro Ethernet network of claim 20, wherein the computer program farther comprises:
instructions to calculate a data packet jitter value between the first edge switch and the second edge switch.

22. The switched metro Ethernet network of claim 21, wherein the computer program farther comprises:
instructions to inject a plurality of artificial data packets into a switched metro Ethernet network from a source address to a destination address.

23. The switched metro Ethernet network of claim 22, wherein the computer program farther comprises:
instructions to collect a plurality of artificial data packets that have been reflected from the destination address back to the source address.

24. The switched metro Ethernet network of claim 23, wherein the computer program farther comprises:
instructions to determine a total number of the reflected artificial data packets.

25. The switched metro Ethernet network of claim 24, wherein the packet delivery rate is calculated at least partially based on the total number of reflected artificial data packets.

26. The switched metro Ethernet network of claim 25, wherein the packet latency value is calculated at least partially based on the total number of reflected artificial data packets.

27. The switched metro Ethernet network of claim 26, wherein the packet jitter value is calculated at least partially based on the total number of reflected artificial data packets.

28. The switched metro Ethernet network of claim 27, wherein the computer program further comprises:
instructions to report at least one of the following to the user computer: the latency value, and the jitter value.

29. The switched metro Ethernet network of claim 22, wherein the first edge switch is located at the source address and the second edge switch is located at the destination address.

30. The switched metro Ethernet network of claim 29, wherein the plurality of artificial data packets are injected into the first edge switch.

31. The switched metro Ethernet network of claim 19, further comprising:

a second customer premises equipment coupled to the second edge switch; and a second user computer coupled to the second customer premises equipment.

32. The switched metro Ethernet network of claim 31, wherein the user computer and the second user computer comprise a graphical user interface and wherein the computer program within the server reports to the first user computer and the second user computer via the graphical user interface.

* * * * *